(12) United States Patent
McAnally et al.

(10) Patent No.: US 7,845,242 B2
(45) Date of Patent: Dec. 7, 2010

(54) THREE PICKOFF SENSOR FLOW METER

(75) Inventors: Craig B McAnally, Thornton, CO (US);
Mark James Bell, Longmont, CO (US);
Gregory Treat Lanham, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 12/374,070

(22) PCT Filed: Jul. 28, 2006

(86) PCT No.: PCT/US2006/029735

§ 371 (c)(1),
(2), (4) Date: Jan. 16, 2009

(87) PCT Pub. No.: WO2008/013545

PCT Pub. Date: Jan. 31, 2008

(65) Prior Publication Data

US 2009/0272173 A1    Nov. 5, 2009

(51) Int. Cl.
*G01F 1/84* (2006.01)
(52) U.S. Cl. .............................................. 73/861.355
(58) Field of Classification Search ............ 73/861.355,
73/861.356, 861.18, 32
See application file for complete search history.

(56) References Cited

U.S. PATENT DOCUMENTS

| 5,661,232 A | 8/1997 | Van Cleve et al. |
| 5,687,100 A * | 11/1997 | Buttler et al. ............... 702/137 |
| 7,152,460 B2 * | 12/2006 | Gysling et al. .............. 73/32 A |

FOREIGN PATENT DOCUMENTS

| GB | 2171200 A | 8/1986 |
| WO | WO-00/04345 A | 1/2000 |
| WO | WO-00/08423 A | 2/2000 |
| WO | WO-2006/001805 A | 1/2006 |

* cited by examiner

*Primary Examiner*—Jewel Thompson
(74) *Attorney, Agent, or Firm*—The Ollila Law Group LLC

(57) ABSTRACT

A three pickoff sensor flow meter (200) is provided according to the invention. The three pickoff sensor flow meter (200) includes a first flow conduit (210a) conducting a first flow stream, a second flow conduit (210b) that is independent of the first flow stream, and a common driver (216) configured to vibrate the first flow conduit (210a) and the second flow conduit (210b). The three pickoff sensor flow meter (200) further includes three pickoff sensors (218, 219a, 219b) configured to provide first and second time delay values ($\Delta t_1$) and ($\Delta t_2$) for the first flow conduit (210a) and the second flow conduit (210b).

38 Claims, 8 Drawing Sheets

THREE PICKOFF SENSOR FLOW METER

BACKGROUND OF THE INVENTION

1. Field of the Invention

The present invention relates to a flow meter, and more particularly to a three pickoff sensor flow meter.

2. Statement of the Problem

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Flow meters are used to perform mass flow rate measurements for a wide variety of flow fluids. One area in which Coriolis flow meters can potentially be used is in the metering and dispensing of fuels, including alternative fuels. The alternative fuels market continues to expand in response to increasing concerns over pollution and further in response to increasing concerns about the cost and availability of unleaded gasoline and other traditional fuels. In fact, many governments are becoming involved by enacting legislation promoting the use of alternative fuels.

An opportunity for the use of Coriolis meters in the alternative fuels market is in the filling of vehicles, such as cars, buses, etc. In the prior art, the filling of individual vehicles has been performed at filling stations utilizing traditional gasoline pumps or utilizing compressed natural gas (CNG) dispensers for alternative fuels. Traditional gasoline fuel dispensers require two individual and independent meters so that two vehicles can be filled simultaneously. A dual meter fuel dispenser can provide two metered flow streams. The two flow streams can flow at different rates. The two flow streams can be of different flow materials (i.e., two different fuels, for example) and can have different densities.

However, the overall cost and size of a fuel pump for an alternative fuels must be minimized in order for the manufacture of the pump to be competitive in such a growing industry.

Therefore, a challenge exists in being able to develop a cost-effective fuel meter that can provide two simultaneous fuel flow measurements on two independent flow streams.

One prior art approach is to install two separate flow meters in such a fuel dispenser. Although this is a workable approach, it has drawbacks. Two meter devices take up double the space in the fuel dispenser as a single meter device. Two meter devices can double the meter expense of a fuel dispenser. Two meter devices can require double the electrical power. Two meter devices can require double the number of dispenser components, such as solenoid valves, regulators, check valves, piping, etc.

SUMMARY OF THE SOLUTION

A three pickoff sensor flow meter is provided according to an embodiment of the invention. The three pickoff sensor flow meter comprises a first flow conduit conducting a first flow stream, a second flow conduit that is independent of the first flow stream, and a common driver configured to vibrate the first flow conduit and the second flow conduit. The three pickoff sensor flow meter further comprises three pickoff sensors configured to provide first and second time delay values ($\Delta t_1$) and ($\Delta t_2$) for the first flow conduit and the second flow conduit.

A three pickoff sensor flow meter is provided according to an embodiment of the invention. The three pickoff sensor flow meter comprises meter electronics configured to receive measurement signals, a first flow conduit conducting a first flow stream, a second flow conduit that is independent of the first flow stream, and a common driver configured to vibrate the first flow conduit and the second flow conduit. The three pickoff sensor flow meter further comprises three pickoff sensors coupled to the meter electronics by four wires.

A three pickoff sensor flow meter is provided according to an embodiment of the invention. The three pickoff sensor flow meter comprises a first flow conduit conducting a first flow stream, a second flow conduit that is independent of the first flow stream, and a common driver configured to vibrate the first flow conduit and the second flow conduit. The three pickoff sensor flow meter further comprises a shared pickoff sensor configured to generate a shared vibrational response from vibration of both the first flow conduit and the second flow conduit, a first independent pickoff sensor configured to generate a first independent vibrational response from vibration of the first flow conduit, and a second independent pickoff sensor configured to generate a second independent vibrational response from vibration of the second flow conduit.

A measurement method for a three pickoff sensor flow meter is provided according to an embodiment of the invention. The method comprises vibrating a first flow conduit conducting a first flow stream and vibrating a second flow conduit. The vibrating is performed by a common driver. The method further comprises receiving a first vibrational response of the first flow conduit. The first vibrational response is generated from a shared pickoff sensor and from a first independent pickoff sensor. The method further comprises receiving a second vibrational response of the second flow conduit. The second vibrational response is generated from the shared pickoff sensor and from a second independent pickoff sensor. The method further comprises determining a first flow stream characteristic from the first vibrational response and the second vibrational response.

A calibration method for a three pickoff sensor flow meter is provided according to an embodiment of the invention. The method comprises zeroing out the three pickoff sensor flow meter and zeroing out one or more reference meters in communication with the three pickoff sensor flow meter. The method further comprises measuring a first flow through a first flow conduit of the three pickoff sensor flow meter using the three pickoff sensor flow meter and using the one or more reference meters. The method further comprises measuring a second flow through a second flow conduit of the three pickoff sensor flow meter using the three pickoff sensor flow meter and using the one or more reference meters. The method further comprises determining two flow calibration factors (FCFs) for the three pickoff sensor flow meter using a first flow measurement and a second flow measurement.

ASPECTS OF THE INVENTION

In one aspect of the flow meter, the first flow conduit and the second flow conduit originate from a common inlet.

In another aspect of the flow meter, the first flow conduit originates from a first inlet and the second flow conduit originates from a second inlet.

In yet another aspect of the flow meter, the flow meter comprises a Coriolis flow meter.

In yet another aspect of the flow meter, the flow meter comprises a vibrating densitometer.

In yet another aspect of the flow meter, the flow meter further comprises meter electronics, with the three pickoff sensors being coupled to the meter electronics by four or more wires.

In yet another aspect of the flow meter, the three pickoff sensors comprise a shared pickoff sensor configured to generate a shared vibrational response from vibration of both the first flow conduit and the second flow conduit, a first independent pickoff sensor configured to generate a first independent vibrational response from vibration of the first flow conduit, and a second independent pickoff sensor configured to generate a second independent vibrational response from vibration of the second flow conduit.

In yet another aspect of the flow meter, the three pickoff sensor flow meter is configured to vibrate the first flow conduit conducting the first flow stream and vibrate the second flow conduit, with the vibrating being performed by the common driver, receive a first vibrational response of the first flow conduit, with the first vibrational response being generated from a shared pickoff sensor and from a first independent pickoff sensor, receive a second vibrational response of the second flow conduit, with the second vibrational response being generated from the shared pickoff sensor and from a second independent pickoff sensor, and determine a first flow stream characteristic from the first vibrational response and the second vibrational response.

In yet another aspect of the flow meter, the flow meter further comprises meter electronics, with the three pickoff sensors being configured to provide first and second time delay values ($\Delta t_1$) and ($\Delta t_2$) for the first flow conduit and the second flow conduit.

In one aspect of the measurement method, the second flow conduit has zero flow.

In another aspect of the measurement method, the second flow conduit conducts a second flow stream.

In yet another aspect of the measurement method, the first flow conduit and the second flow conduit originate from a common input.

In yet another aspect of the measurement method, the first flow conduit originates from a first input and the second flow conduit originates from a second input.

In yet another aspect of the measurement method, the second flow conduit conducts a second flow stream that is independent of the first flow stream and the method further comprises determining a second flow stream characteristic from the first vibrational response and the second vibrational response.

In yet another aspect of the measurement method, the determining further comprises using the first vibrational response and the second vibrational response in equations $$\dot{m}_1 = FCF_{11}(\Delta t_{11} - \Delta t z_{11}) \times (1 - Tc_1 \times Tm_1) + FCF_{12}(\Delta t_{12} - \Delta t z_{12}) \times (1 - Tc_2 \times Tm_2)$$

and $$\dot{m}_2 = FCF_{22}(\Delta t_{22} - \Delta t z_{22}) \times (1 - Tc_2 \times Tm_2) + FCF_{21}(\Delta t_{21} - \Delta t z_{21}) \times (1 - Tc_1 \times Tm_1)$$

in order to determine a first mass flow rate ($\dot{m}_1$) of the first flow stream and a second mass flow rate ($\dot{m}_2$) of the second flow stream.

In yet another aspect of the measurement method, the determining further comprises using the first vibrational response and the second vibrational response in equations $$\dot{m}_1 = FCF_{11}(\Delta t_1 - \Delta t z_1) \times (1 - Tc_1 \times Tm_1) + FCF_{12}(\Delta t_2 - \Delta t z_2) \times (1 - Tc_2 \times Tm_2)$$

and $$\dot{m}_2 = FCF_{22}(\Delta t_2 - \Delta t z_2) \times (1 - Tc_2 \times Tm_2) + FCF_{21}(\Delta t_1 - \Delta t z_z) \times (1 - Tc_1 \times Tm_1)$$

in order to determine a first mass flow rate ($\dot{m}_1$) of the first flow stream and a second mass flow rate ($\dot{m}_2$) of the second flow stream.

In yet another aspect of the measurement method, the measurement method further comprises zeroing out the three pickoff sensor flow meter for a calibration process, zeroing out one or more reference meters in communication with the three pickoff sensor flow meter, measuring a first flow through the first flow conduit of the three pickoff sensor flow meter using the three pickoff sensor flow meter and using the one or more reference meters, measuring a second flow through the second flow conduit of the three pickoff sensor flow meter using the three pickoff sensor flow meter and using the one or more reference meters, and determining two flow calibration factors (FCFs) for the three pickoff sensor flow meter using a first flow measurement and a second flow measurement.

In yet another aspect of the measurement method, the determining comprises determining the two flow calibration factors (FCFs) for the three pickoff sensor flow meter using the equation $$\begin{Bmatrix} FCF_{11} \\ FCF_{12} \\ FCF_{21} \\ FCF_{22} \end{Bmatrix} = \begin{bmatrix} \Delta t_1^1 - z_1 & \Delta t_2^1 - z_2 & 0 & 0 \\ 0 & 0 & \Delta t_1^1 - z_1 & \Delta t_2^1 - z_2 \\ \Delta t_1^2 - z_1 & \Delta t_2^2 - z_2 & 0 & 0 \\ 0 & 0 & \Delta t_1^2 - z_1 & \Delta t_2^2 - z_2 \end{bmatrix}^{(-1)} \begin{Bmatrix} REF_1 \\ 0 \\ 0 \\ REF_2 \end{Bmatrix}.$$

In yet another aspect of the measurement method, the determining comprises determining the two flow calibration factors (FCFs) for the three pickoff sensor flow meter using the equation $$\begin{Bmatrix} \dot{m}_1 \\ \dot{m}_2 \end{Bmatrix} \begin{bmatrix} FCF_{11} & FCF_{12} \\ FCF_{21} & FCF_{22} \end{bmatrix} \begin{Bmatrix} \Delta t_1 - z_1 \\ \Delta t_2 - z_2 \end{Bmatrix}.$$

In one aspect of the calibration method, the determining comprises determining the two flow calibration factors (FCFs) for the multiple flow conduit flow meter using the equation $$\begin{Bmatrix} FCF_{11} \\ FCF_{12} \\ FCF_{21} \\ FCF_{22} \end{Bmatrix} = \begin{bmatrix} \Delta t_1^1 - z_1 & \Delta t_2^1 - z_2 & 0 & 0 \\ 0 & 0 & \Delta t_1^1 - z_1 & \Delta t_2^1 - z_2 \\ \Delta t_1^2 - z_1 & \Delta t_2^2 - z_2 & 0 & 0 \\ 0 & 0 & \Delta t_1^2 - z_1 & \Delta t_2^2 - z_2 \end{bmatrix}^{(-1)} \begin{Bmatrix} REF_1 \\ 0 \\ 0 \\ REF_2 \end{Bmatrix}.$$

In another aspect of the calibration method, the determining comprises determining the two flow calibration factors (FCFs) for the multiple flow conduit flow meter using the equation $$\begin{Bmatrix} \dot{m}_1 \\ \dot{m}_2 \end{Bmatrix} \begin{bmatrix} FCF_{11} & FCF_{12} \\ FCF_{21} & FCF_{22} \end{bmatrix} \begin{Bmatrix} \Delta t_1 - z_1 \\ \Delta t_2 - z_2 \end{Bmatrix}.$$

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
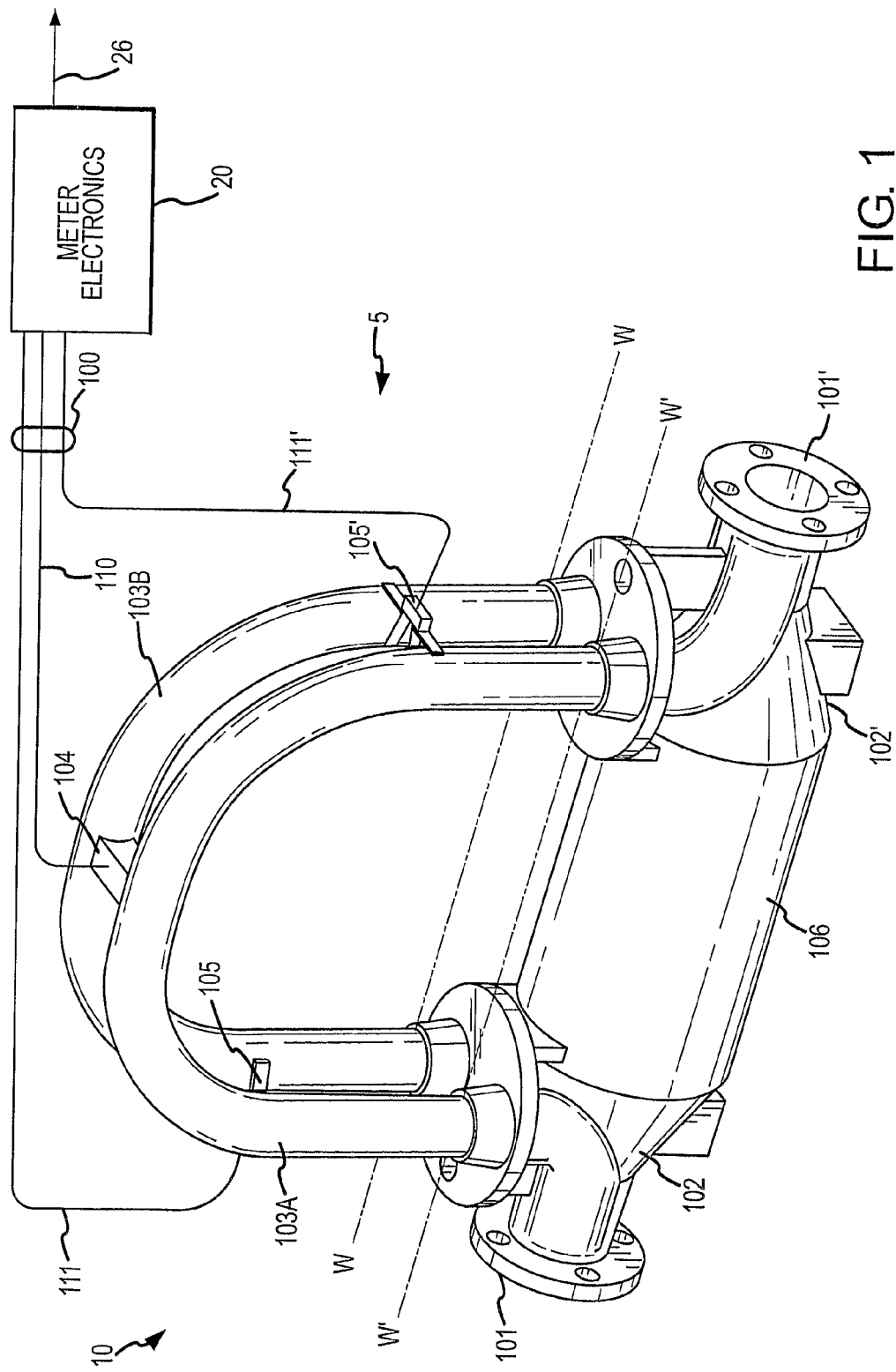
FIG. 1 illustrates a flow meter comprising a flow meter assembly and meter electronics.

FIG. 1 illustrates a flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used in any type of Coriolis flow meter regardless of the number of drivers, pick-off sensors, flow conduits, or the operating mode of vibration, In addition, it should be recognized that the flow meter 5 can alternatively comprise a vibratory densitometer.

Flow meter assembly 10 includes a pair of flanges 101 and 101', manifolds 102 and 102', driver 104, pick-off sensors 105-105', and flow conduits 103A and 103B. Driver 104 and pick-off sensors 105 and 105' are connected to flow conduits 103A and 103B.

Flanges 101 and 101' are affixed to manifolds 102 and 102'. Manifolds 102 and 102' can be affixed to opposite ends of a spacer 106. Spacer 106 maintains the spacing between manifolds 102 and 102' to prevent undesired vibrations in flow conduits 103A and 103B. When flow meter assembly 10 is inserted into a conduit system (not shown) which carries the material being measured, material enters flow meter assembly 10 through flange 101, passes through inlet manifold 102 where the total amount of material is directed to enter flow conduits 103A and 103B, flows through flow conduits 103A and 103B and back into outlet manifold 102' where it exits meter assembly 10 through flange 101'.

Flow conduits 103A and 103B are selected and appropriately mounted to inlet manifold 102 and outlet manifold 102' so as to have substantially the same mass distribution, moments of inertia, and elastic modules about bending axes W—W and W'—W' respectively. The flow conduits extend outwardly from the manifolds in an essentially parallel fashion.

Flow conduits 103A and 103B are driven by driver 104 in opposite directions about their respective bending axes W and W' and at what is termed the first out of phase bending mode of the flow meter. Driver 104 may comprise one of many well known arrangements, such as a magnet mounted to flow conduit 103A and an opposing coil mounted to flow conduit 103B. An alternating current is passed through the opposing coil to cause both conduits to oscillate. A suitable drive signal is applied by meter electronics 20, via lead 110 to driver 104.

Meter electronics 20 receives sensor signals on leads 111 and 111', respectively. Meter electronics 20 produces a drive signal on lead 110 which causes driver 104 to oscillate flow conduits 103A and 103B. Meter electronics 20 processes left and right velocity signals from pick-off sensors 105 and 105' in order to compute a mass flow rate. Path 26 provides an input and an output means that allows meter electronics 20 to interface with an operator or with other electronic systems. The description of FIG. 1 is provided merely as an example of the operation of a Coriolis flow meter and is not intended to limit the teaching of the present invention.

Figure 2:
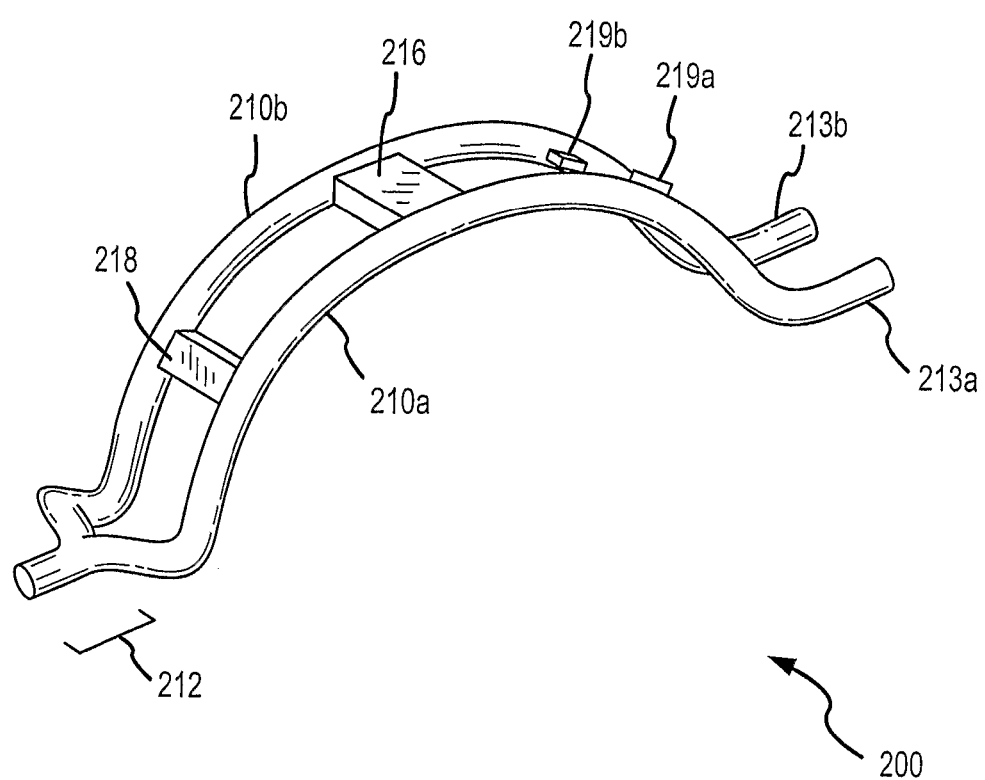
FIG. 2 shows a three pickoff sensor flow meter according to an embodiment of the invention.

FIG. 2 shows a three pickoff sensor flow meter 200 according to an embodiment of the invention. The three pickoff sensor flow meter 200 includes a first flow conduit 210a and a second flow conduit 210b. The first flow conduit 210a and the second flow conduit 210b in this embodiment originate from a common inlet 212 and have independent first and second outlets 213a and 213b. The two flow conduits 210a and 210b can include flanges (not shown) at the intake and output ends.

A common driver 216 is located between the first flow conduit 210a and the second flow conduit 210b. The common driver 216 is configured to simultaneously vibrate both the first and second flow conduits 210a and 210b.

A shared pickoff sensor 218 is located between the first flow conduit 210a and the second flow conduit 210b. The shared pickoff sensor 218 is configured to generate a shared vibrational response from vibration of both the first flow conduit 210a and the second flow conduit 210b. The shared pickoff sensor 218 can comprise either an upstream pickoff sensor or a downstream pickoff sensor.

A first independent pickoff sensor 219a is coupled to the first flow conduit 210a and is configured to generate a first independent vibrational response from vibration of the first flow conduit 210a. A second independent pickoff sensor 219b is coupled to the second flow conduit 210b and is configured to generate a second independent vibrational response from vibration of the second flow conduit 210b.

The first and second independent pickoff sensors 219a and 219b can be supported by any manner of rigid support structure (not shown), wherein the first and second independent pickoff sensors 219a and 219b are held in a fixed position by the support structure and measure relative motion of the vibration of the corresponding flow conduits. Each of the independent pickoff sensors 219a and 219b therefore generates a vibrational response for a single flow conduit, independent of the other flow conduit (and independent of the other flow stream).

The shared pickoff sensor 218 and the first and second independent pickoff sensors 219a and 219b are coupled to the meter electronics 20 by four leads 100 (see also FIG. 3 and the accompanying discussion below). Consequently, the vibrational response from the shared pickoff sensor 218 and the vibrational responses from the first and second independent pickoff sensors 219a and 219b are received and processed by the meter electronics 20 (see FIG. 1).

The meter electronics 20 in one embodiment is configured to vibrate the first flow conduit 210a conducting a first flow stream and vibrate a second flow conduit 210b, with the vibrating being performed by the common driver 216. It should be understood that the second flow conduit 210b does not have to be conducting a flow stream. The meter electronics 20 is further configured to receive a first vibrational response of the first flow conduit 210a, with the first vibrational response being generated from the shared pickoff sensor 218 and from the first independent pickoff sensor 219a, receive a second vibrational response of the second flow conduit 210b, with the second vibrational response being generated from the shared pickoff sensor 218 and from the second independent pickoff sensor 219b, and determine a first flow stream characteristic from the first vibrational response and the second vibrational response.

The first vibrational response comprises the shared vibrational response from the shared pickoff sensor 218 and the first independent vibrational response from the first independent pickoff sensor 219a. A first flow conduit time delay ($\Delta t_1$) comprises a phase difference between the shared vibrational response and the first independent vibrational response.

The second vibrational response comprises the shared vibrational response and the second independent vibrational response from the second independent pickoff sensor 219b. A second flow conduit time delay ($\Delta t_2$) comprises a phase difference between the shared vibrational response and the second independent vibrational response.

A time delay ($\Delta t$) therefore reflects a phase difference between an upstream vibrational response and a downstream vibrational response of a flow conduit. The first flow conduit time delay ($\Delta t_1$) and the second flow conduit time delay ($\Delta t_2$) can be used by the meter electronics 20 to determine various flow stream characteristics for the three pickoff sensor flow meter 200.

The meter electronics 20 can generate a first flow measurement related to the first flow stream and can generate a second flow measurement related to the second flow stream. For example, the first flow conduit time delay ($\Delta t_1$) and the second flow conduit time delay ($\Delta t_2$) can be used to determine first and second mass flow rates ($\dot{m}_1$) and ($\dot{m}_2$). The processing can also generate density measurements.

Another flow stream characteristic that can be generated by the processing is a viscosity value for each flow stream. If the two flow conduits are of different flow areas, for example, the three pickoff sensor flow meter 200 can be configured to measure dynamic viscosity and coating. Other flow stream characteristics can also be generated by the processing and are within the scope of the description and claims.

The first flow stream is independent of the second flow stream. As a result, the first flow stream is not linked to or influenced by the second flow stream, and vice versa. Consequently, the flow through each flow conduit can be measured and controlled independently of the flow through the other conduit.

In one embodiment, the first flow stream can have a different flow rate than the second flow stream. In one embodiment, the first flow stream can comprise a first flow material and the second flow stream can comprise a second flow material (see FIG. 5). The first flow stream can have a first density and the second flow stream can have a second density. For example, the first flow stream can comprise a first fuel and the second flow stream can comprise a second fuel. The fuels can be flowing at different rates. Therefore, the first and second flow measurements can be used by the meter electronics 20 to conduct two independent fuel metering transactions, for example.

The flow meter 200 in one embodiment comprises a Coriolis flow meter. Alternatively, the flow meter 200 comprises a vibrating densitometer.

The flow meter 200 can comprise two operable flow conduits, as shown. Alternatively, the flow meter 200 can comprise one operable flow conduit for conducting a flow stream and one dummy flow conduit that does not conduct a flow stream. In another alternative, the flow meter 200 can comprise a flow conduit in combination with a balance beam or balance bar.

In one embodiment, the first flow stream and the second flow stream can originate from the common inlet 212, as shown. Alternatively, the first flow stream can originate from a first inlet 212a and the second flow stream can originate from a second inlet 212b.

In one embodiment, the flow conduits 210a and 210b comprise substantially U-shaped flow conduits, as shown. Alternatively, the flow conduits 210a and 210b can comprise substantially straight flow conduits (not shown). However, other shapes can also be used, and are within the scope of the description and claims.

In one embodiment, the first flow conduit 210a has the same cross-sectional area as the second flow conduit 210b. Alternatively, they can have differing cross-sectional areas.

Figure 3:
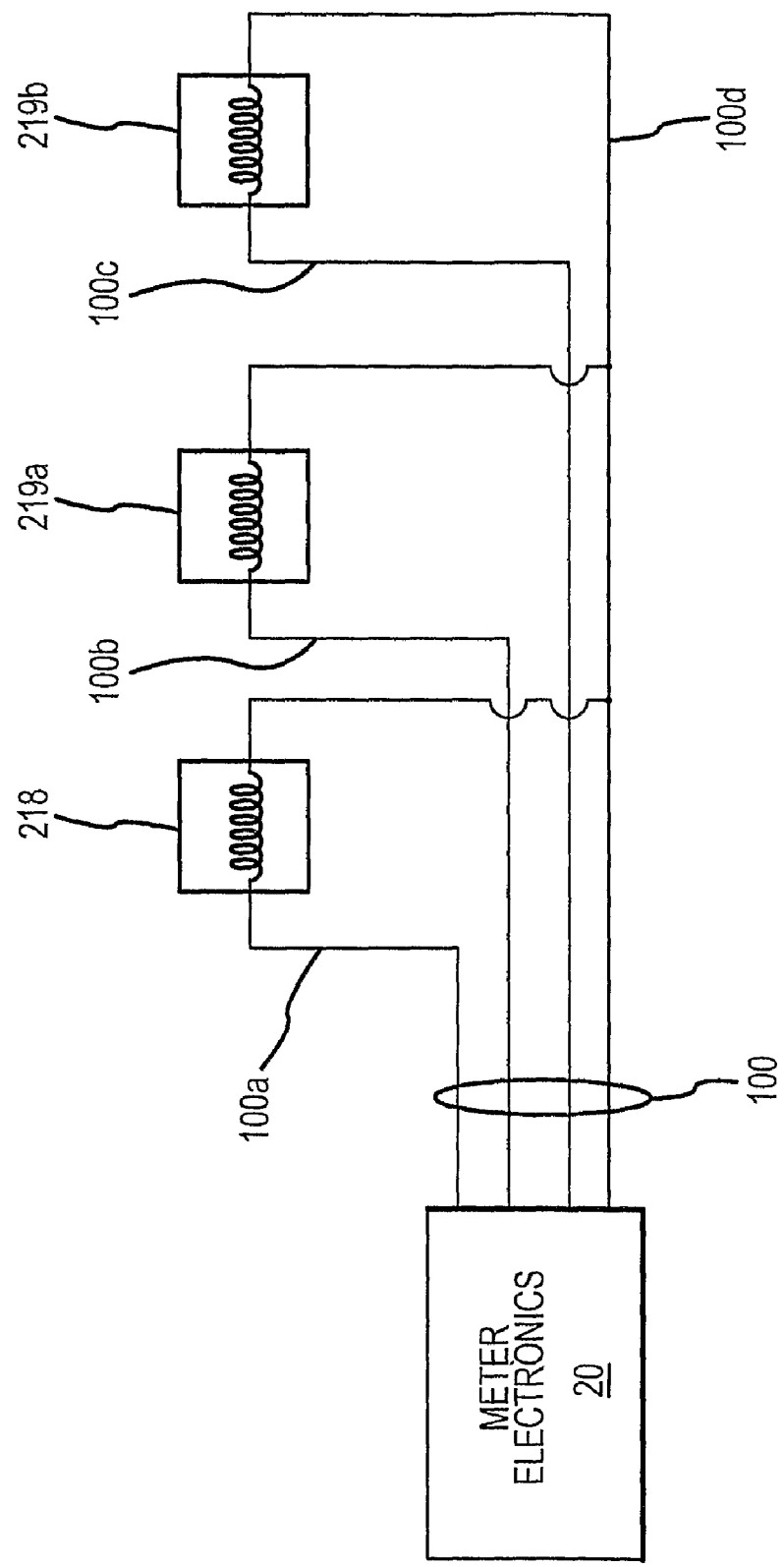
FIG. 3 shows the three pickoff sensor flow meter according to an embodiment of the invention.

FIG. 3 shows the three pickoff sensor flow meter 200 according to an embodiment of the invention. The figure shows the meter electronics 20 connected to the pickoff sensors 218, 219a, and 219b by the leads 100. The leads 100 can comprise a portion of a cabling that connects the flow meter assembly 10 to the meter electronics 20 (see FIG. 1).

The leads 100 include a lead 100a connected to the shared pickoff sensor 218, a lead 100b connected to the first independent pickoff sensor 219a, a lead 100c connected to the second independent pickoff sensor 219b, and a common lead 100d connected to all three of the pickoff sensors 218, 219a, and 219b.

Single-ended measurements are performed between leads 100a and 100d, between leads 100b and 100d, and between leads 100c and 100d. Such a single-ended measurement configuration reduces the number of required pickoff wires to four.

The invention takes advantage of the phase-locked loop of a drive algorithm for the flow meter 200. The drive algorithm can lock the phase between one of the pickoff sensors and the drive signal, using the phase-locked loop configuration. Conveniently, the shared pickoff sensor 218 can be locked to the drive signal for simplicity. By taking advantage of this locking feature in the pickoff sensor arrangement, it is possible to have a single pickoff sensor locked in phase to the drive signal and have two independent pickoff sensors, allowing two independent vibrational responses. The time delay ($\Delta t$) is measured between the locked pickoff sensor and each of the two independent pickoff sensors. In addition, the locked pickoff sensor can also comprise a reference feedback signal that is further used for generating the drive signal.

Figure 4:
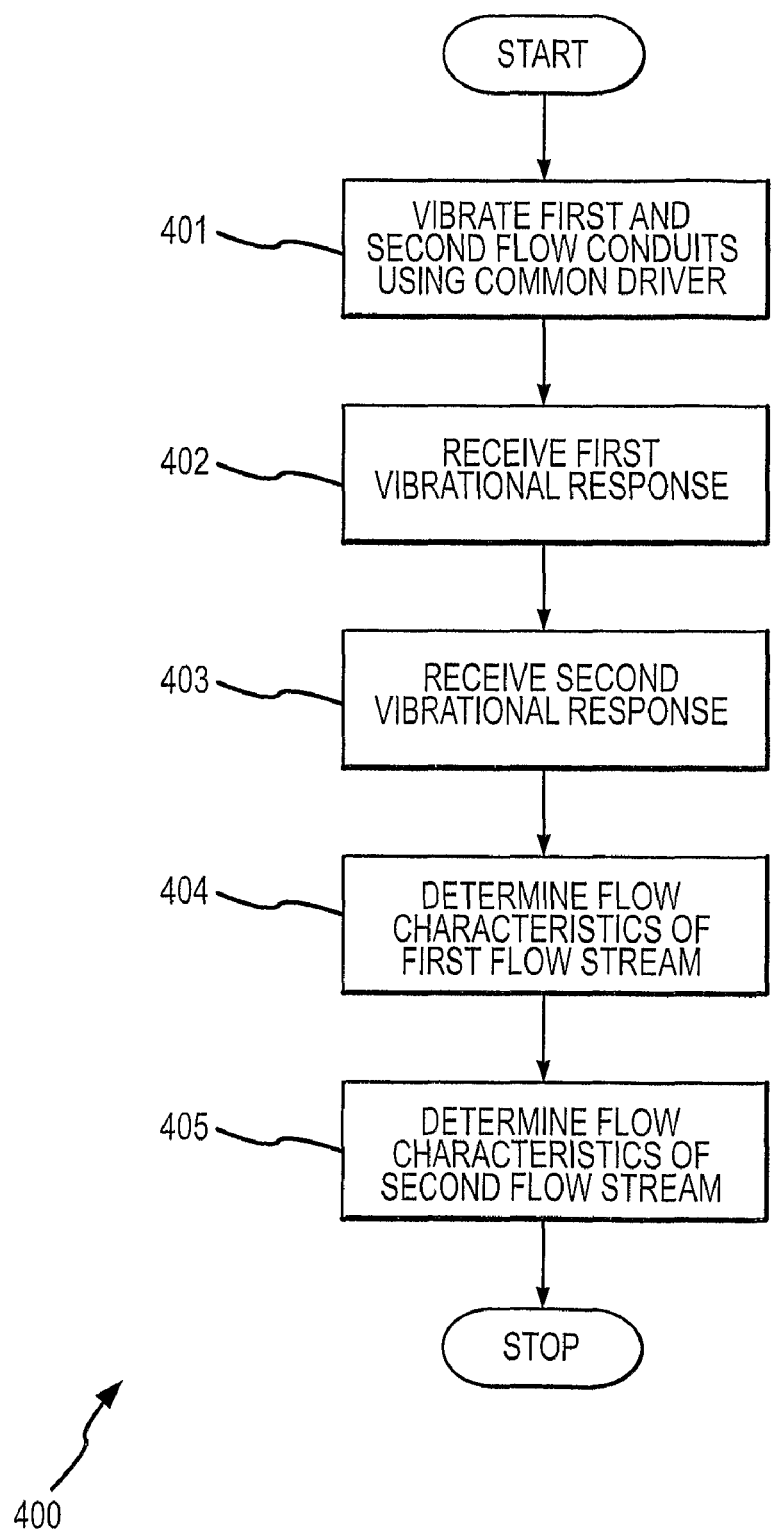
FIG. 4 is a flowchart of a measurement method for a three pickoff sensor flow meter according to an embodiment of the invention.

FIG. 4 is a flowchart 400 of a measurement method for a three pickoff sensor flow meter according to an embodiment of the invention. The method can be used to measure flow through just the first flow conduit 210a, to measure flow through just the second flow conduit 210b, or to measure simultaneous flows through both the first and second flow conduits 210a and 210b.

In step 401, the first flow conduit and the second flow conduit are vibrated by the common driver 216. The first flow conduit 210a can conduct a first flow stream and the second flow conduit 210b can conduct a second flow stream.

In step 402, a first vibrational response of the first flow conduit 210a is received. The first vibrational response comprises an electrical signal generated by the shared pickoff sensor 218 and an electrical signal generated by the first independent pickoff sensor 219a. The first flow material is flowing in the first flow conduit 210a. The first vibrational response therefore can include a vibrational response of a flow material in the first flow conduit 210a.

In step 403, a second vibrational response of the second flow conduit 210b is received. The second vibrational response comprises an electrical signal generated by the shared pickoff sensor 218 and an electrical signal generated by the second independent pickoff sensor 219b. The second vibrational response therefore can include a vibrational response of a flow material in the second flow conduit 210b, can include a non-flow vibrational response, or can include a vibrational response of the empty second flow conduit 210b.

In step 404, a first flow stream characteristic is determined. It should be understood that more than one first flow stream characteristic can be determined in this step. The first flow stream characteristic is determined from the first and the second vibrational responses. The first flow stream characteristic can comprise a mass flow rate ($\dot{m}_1$) of the first flow material. In addition, the density, viscosity, etc., of the first flow material can be determined from the first and the second vibrational responses.

In step 405, a second flow stream characteristic is determined. It should be understood that more than one flow stream characteristic for the second flow stream can be determined in this step. The second flow stream characteristic is determined from the first and second vibrational responses. The second flow stream characteristic can comprise a mass flow rate ($\dot{m}_2$) of the second flow material. In addition, the density, viscosity, etc., of the second flow material can be determined from the first and the second vibrational responses.

Although the flow through each flow conduit is independent, the measurement of mass flow in one flow conduit is not independent of the flow through the other conduit. A flow through one conduit induces a phase in the other conduit. Because of this linkage, a new mass flow equation is used for the two flow conduits of the three pickoff sensor flow meter 200 according to the invention. The new dual flow conduit equations are based on the time delay experienced by both flow conduits 210a and 210b (i.e., $\Delta t_1$ and $\Delta t_2$).

In a traditional dual tube Coriolis flow meter, a phase is measured between two flow conduits and a phase difference is calculated between inlet side pickoffs and outlet side pickoffs of the meter. This phase difference is converted into a single time delay ($\Delta t$) and is used to determine a flow amount (such as a mass flow rate $\dot{m}$, for example), by employing the equation:

$$\dot{m} = FCF \times (\Delta t - \Delta tz) * (1 - T_c \times T) \quad (1)$$

In this equation, a single measurement of time delay ($\Delta t$) can be used to measure flow. The time delay ($\Delta t$) is adjusted by a time delay at zero ($\Delta tz$). The time delay at zero ($\Delta tz$) comprises a calibration factor that is determined under no-flow conditions.

However, this traditional mass flow rate equation is not adequate for the two flow conduits of the three pickoff sensor flow meter 200. The reason is that in the dual flow conduits of the invention, the flow induces some phase in both flow conduits. This is true even when there is flow in only one of the two flow conduits. In the traditional flow meter, because a common flow passes through both flow conduits, the induced phase is identical in each conduit. As a result, the induced phase does not appear as a phase difference between the two conduits and is not a factor in calculating a result. Therefore, a single time delay can be used in the prior art in order to determine a flow rate in a traditional flow meter.

In contrast, in the invention the first and second flow streams are independent. As a consequence, phase induced by the two flows may differ between the two flow conduits. Therefore, a mass flow rate equation based on a single time delay cannot be employed.

Flow in the three pickoff sensor flow meter 200 induces phase in both flow conduits 210a and 210b, even though flow may only exist in one of the flow conduits. The two induced phases may differ. As a result, two time delay measurements are required from each flow conduit in order to measure flow. The flow measurement can be for one or two flows. One illustration of this measurement scheme can be illustrated with the following equations:

$$\dot{m}_1 = FCF_{11}(\Delta t_{11} - \Delta t z_{11}) \times (1 - Tc_1 \times Tm_1) + FCF_{12}(\Delta t_{12} - \Delta t z_{12}) \times (1 - Tc_2 \times Tm_2) \quad (2)$$

$$\dot{m}_2 = FCF_{22}(\Delta t_{22} - \Delta t z_{22}) \times (1 - Tc_2 \times Tm_2) + FCF_{21}(\Delta t_{21} - \Delta t z_{21}) \times (1 - Tc_1 \times Tm_1) \quad (3)$$

where the subscript 1 refers to the first flow conduit 210a and the subscript 2 refers to the second flow conduit 210b. The second term in equations (2) and (3) (i.e., for the "2" of the $FCF_{12}$ term, for example) is required due to the fact that flow through one flow tube induces a phase in the other tube. Equations (2) and (3) can be used in the meter electronics 20 for determining mass flow rates in both flow conduits 210a and 210b.

Hereinafter, for time delay values of the form ($\Delta t_B^A$), the superscript A denotes which flow conduit is conducting flow.

If flow is being conducted through the second flow conduit 210b, then the time delay value will be of the form ($\Delta t_B^2$). The subscript B denotes the flow conduit that a vibrational response is being received from. Therefore, the value ($\Delta t_2^1$) is the time delay measured for the second flow conduit wherein the flow is through the first flow conduit 210a. Alternatively, the value ($\Delta t_1^2$) is the time delay measured for the first flow conduit 210a wherein the flow is through the second flow conduit 210b. A superscript of zero denotes a no-flow condition, wherein the value ($\Delta t_1^0$) denotes a time delay measured for the first flow conduit 210a wherein the first flow conduit is vibrated by the common driver 220 under a zero or no-flow condition.

However, a simpler form of equations (2) and (3) can be used for determining the flow stream characteristics. Equations (2) and (3) do not take advantage of any symmetry. One possible form of symmetry is in the time delay. If the time delay is symmetric, i.e., if:

$$\Delta t_{11} \cong \Delta t_1 \quad (4a)$$

$$\Delta t_{12} \cong \Delta t_2 \quad (4b)$$

$$\Delta t_{21} \cong \Delta t_1 \quad (4c)$$

$$\Delta t_{22} \cong \Delta t_2 \quad (4d)$$

then equations (2) and (3) become:

$$\dot{m}_1 = FCF_{11}(\Delta t_1 - \Delta tz_1) \times (1 - Tc_1 \times Tm_1) + FCF_{12}(\Delta t_2 - \Delta tz_2) \times (1 - Tc_2 \times Tm_2) \quad (5)$$

$$\dot{m}_2 = FCF_{22}(\Delta t_2 - \Delta tz_2) \times (1 - Tc_2 \times Tm_2) + FCF_{21}(\Delta t_1 - \Delta tz_z) \times (1 - Tc_1 \times Tm_1) \quad (6)$$

The T terms represent temperature measurements. The $Tc_1$ term is the temperature of the first flow conduit 210a and the $Tm_1$ term is the temperature of the first flow fluid. Likewise, the $Tc_2$ term is the temperature of the second flow conduit 210b and the $Tm_2$ term is the temperature of the second flow fluid. The ($\Delta tz_1$) value is the zero flow calibration value for the first flow conduit 210a and the ($\Delta tz_2$) value is the zero flow calibration value for the second flow conduit 210b. The flow calibration factors $FCF_{11}$, $FCF_{12}$, $FCF_{21}$, and $FCF_{22}$ are calibration coefficients that are determined by flow tests and subsequently are used in flow stream characteristic calibrations.

Additionally, the flow calibration factors could also be symmetric. In this case, equations (5) and (6) would be further simplified by the fact that the flow calibration factors may be approximately symmetrical, i.e., $FCF_{12} \cong FCF_{21}$. The symmetry of the equations would influence the calibration process.

The ability to measure two mass flow rates may also make it possible to measure additional process variables beyond just the two mass flow rates. For instance, if the two flow conduits are of different cross-sectional flow areas, the ratio of the two flow rates can be related to dynamic viscosity. Another potential application would be the measurement of coating on the interior surfaces of the flow conduits. Such flow conduit coating will induce an unbalanced mass in the system and this unbalanced mass may be detectable through a ratio of amplitudes of the two resulting flow conduit vibrational responses. These are just two examples of what may be feasible with a flow meter that measures two independent flow streams.

Figure 5:
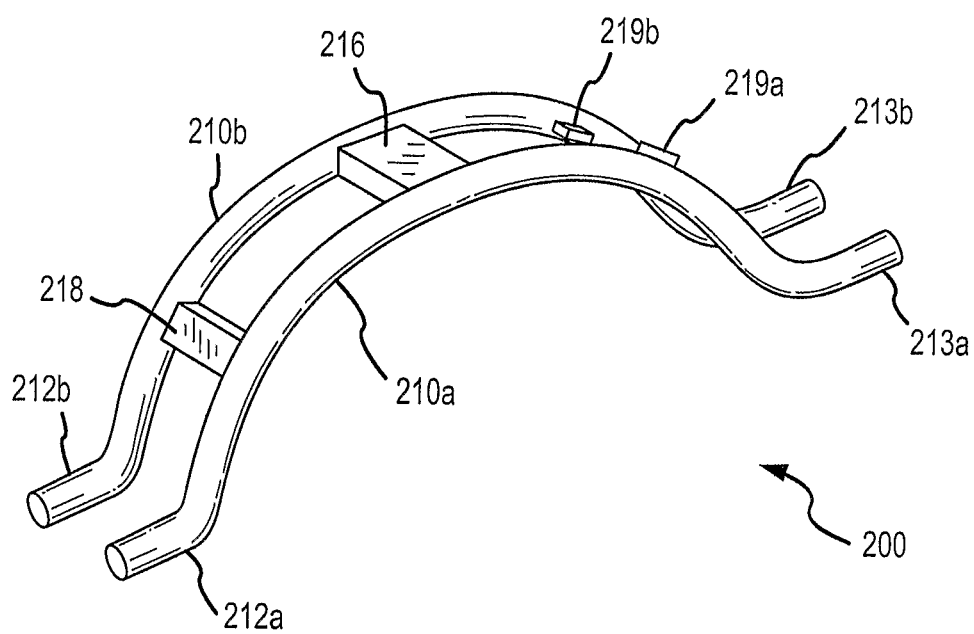
FIG. 5 shows the three pickoff sensor flow meter according to an embodiment of the invention.

FIG. 5 shows the three pickoff sensor flow meter 200 according to an embodiment of the invention. In this embodiment, the first flow stream originates from a first inlet 212a and passes through the first flow conduit 210a. Likewise, the second flow stream originates from a second inlet 212b and passes through the second flow conduit 210b. Otherwise, the operation of the flow meter 200 of this embodiment is the same as the flow meter of FIG. 2.

Figure 6:
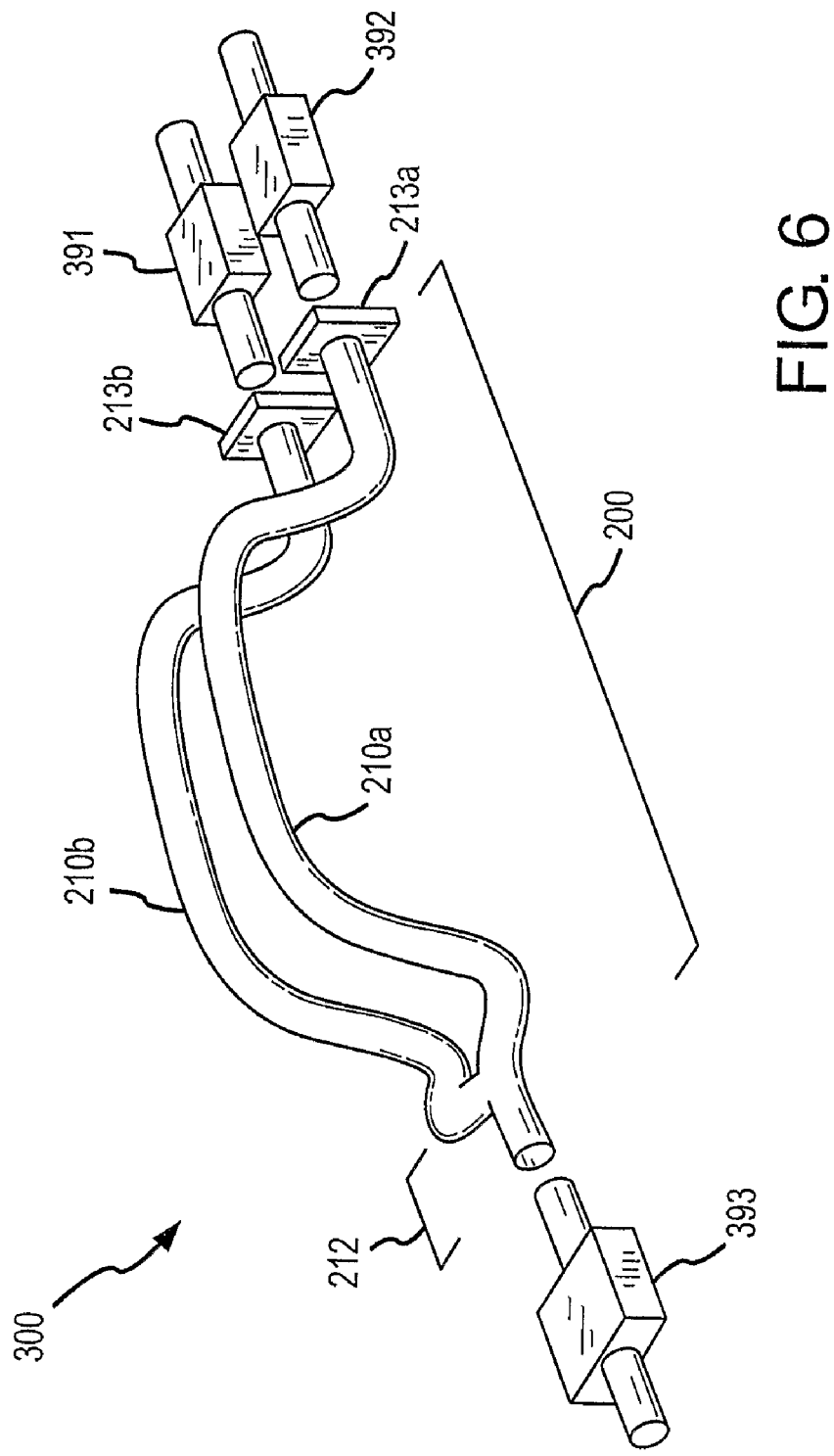
FIG. 6 shows the three pickoff sensor flow meter in a calibration set-up according to an embodiment of the invention.

FIG. 6 shows the three pickoff sensor flow meter 200 in a calibration set-up 300 according to an embodiment of the invention. In this embodiment, where the flow meter 200 has a common inlet 212, first and second reference meters 391 and 392 are connected to the respective outlets 213a and 213b of the first and second flow conduits 210a and 210b. Flow through the first and second flow conduits 210a and 210b can be controlled by downstream valves or other devices (not shown) that are in communication with the two outlets 213a and 213b.

The calibration procedure for a prior art single flow Coriolis meter represented by equation (1) is quite simple. The time delay at zero ($\Delta tz$) is determined under zero flow conditions in the three pickoff sensor flow meter 200 and the FCF value is determined with a test at a single flow rate. However, it can be seen from equations (2) and (3) and (5) and (6) that a similar strategy (measure ($\Delta tz$) at zero and test at one flow rate per tube) would not work for a three pickoff sensor flow meter having two independent flow conduits.

The measurements obtained from the calibration set-up 300 can be used for calibrating the three pickoff sensor flow meter 200 according to the various embodiments. Possible calibration operations are discussed below, such as in conjunction with FIG. 7. However, other calibration techniques are contemplated and are within the scope of the description and claims.

The first reference meter 391 measures the first flow stream flowing through the first flow conduit 210a and generates a ($\dot{m}_1$) measurement value. The second reference meter 392 measures the second flow stream flowing through the second flow conduit 210b and generates a ($\dot{m}_2$) measurement value. Therefore, the flow through each flow conduit and associated reference meter is separate from and independent of the flow through the other flow conduit. In addition, other flow measurements can be obtained.

In addition, the calibration set-up 300 can include a reference meter 393 that measures a total mass flow rate ($\dot{m}$) going into the three pickoff sensor flow meter 200. The two inlet embodiment of FIG. 5 may include the reference meters 391 and 392 but not the reference meter 393.

Figure 7:
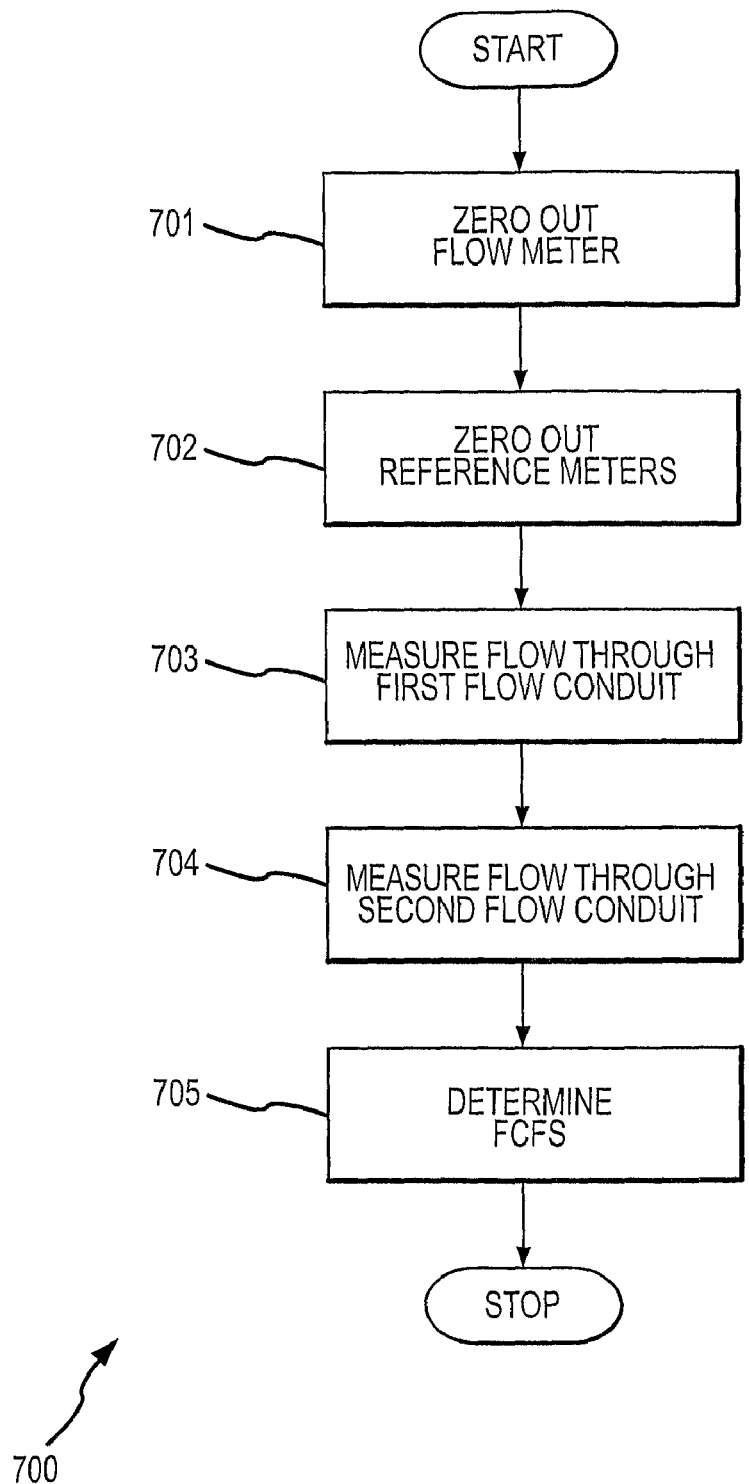
FIG. 7 is a flowchart of a calibration method for a three pickoff sensor flow meter according to an embodiment of the invention.

FIG. 7 is a flowchart 700 of a calibration method for a three pickoff sensor flow meter according to an embodiment of the invention. A basic equation for calibration comprises:

$$\begin{Bmatrix} \dot{m}_1 \\ \dot{m}_2 \end{Bmatrix} = \begin{bmatrix} FCF_{11} & FCF_{12} \\ FCF_{21} & FCF_{22} \end{bmatrix} \begin{Bmatrix} \Delta t_1 - z_1 \\ \Delta t_2 - z_2 \end{Bmatrix} \quad (7)$$

In step 701, the three pickoff sensor flow meter 200 (i.e., the device under test, see FIG. 6) is zeroed out. In this step, both flow conduits 210a and 210b of the flow meter 200 are filled with flow material, although no flow is permitted through the flow meter 200. The flow conduits 210a and 210b are vibrated under the no-flow condition and one or more flow stream characteristics are determined, such as the $\Delta t_1^0$ and $\Delta t_2^0$ time delay values for the first and second flow conduits, for example.

For step 701, where the flow is zero (mass flow rate $\dot{m} = 0$) and a zeroing operation is being performed, equation (7) becomes:

$$\left\{ \begin{array}{c} 0 \\ 0 \end{array} \right\} = \begin{bmatrix} FCF_{11} & FCF_{12} \\ FCF_{21} & FCF_{22} \end{bmatrix} \left\{ \begin{array}{c} \Delta t_1^0 - z_1 \\ \Delta t_2^0 - z_2 \end{array} \right\} \Rightarrow \left\{ \begin{array}{c} z_1 \\ z_2 \end{array} \right\} = \left\{ \begin{array}{c} \Delta t_1^0 \\ \Delta t_2^0 \end{array} \right\} \quad (8)$$

In step 702, the reference meters 391 and 392 are zeroed out, as described immediately above (i.e., using a zero flow condition). It should be understood that this step can be performed before or after step 701.

In step 703, flow is generated only through the first flow conduit 210a. During the flow, both the flow meter 200 and the first reference meter 391 measure first flow stream characteristics in the first flow conduit 210a. For example, the flow meter 200 can record an upstream-downstream time delay ($\Delta t_1^1$) for the first flow conduit 210a, with the flow being through the first flow conduit 210a. The flow meter 200 measures a time delay ($\Delta t_2^1$) for the second flow conduit 210b during the flow through the first flow conduit 210a but where there is no flow through the second flow conduit 210b. In addition, the first reference meter 391 measures the mass flow rate of the flow through the first flow conduit 210a (i.e., it generates the REF$_1$ value).

For step 703, where flow is generated in the first flow conduit 210a, then equation (7) becomes:

$$\left\{ \begin{array}{c} \dot{m}_1 \\ \dot{m}_2 \end{array} \right\} = \begin{bmatrix} FCF_{11} & FCF_{12} \\ FCF_{21} & FCF_{22} \end{bmatrix} \left\{ \begin{array}{c} \Delta t_1^1 - z_1 \\ \Delta t_2^1 - z_2 \end{array} \right\} = \left\{ \begin{array}{c} REF_1 \\ 0 \end{array} \right\} \quad (9)$$

In step 704, flow is generated through the second flow conduit 210b. During the flow, both the three pickoff sensor flow meter 200 and the second reference meter 392 measure second flow stream characteristics in the second flow conduit 210b. For example, the flow meter 200 measures a time delay ($\Delta t_2^2$) for the second flow conduit 210b with the flow being through the second flow conduit 210b. The flow meter 200 measures a time delay ($\Delta t_1^2$) for the first flow conduit 210a during the flow through the second flow conduit 210b but where there is no flow through the first flow conduit 210a. In addition, the second reference meter 392 measures the mass flow rate of the flow through the second flow conduit 210b (i.e., it generates the REF$_2$ value). Alternatively, for the calibration setup 800 shown in FIG. 8, the valves 394a and 394b can be used to direct flow through the second flow conduit 210b. Therefore, only the single reference meter 393 is required in the calibration setup 800.

For step 704, where flow is generated in the second flow conduit 210b, then equation (7) becomes:

$$\left\{ \begin{array}{c} \dot{m}_1 \\ \dot{m}_2 \end{array} \right\} = \begin{bmatrix} FCF_{11} & FCF_{12} \\ FCF_{21} & FCF_{22} \end{bmatrix} \left\{ \begin{array}{c} \Delta t_1^2 - z_1 \\ \Delta t_2^2 - z_2 \end{array} \right\} = \left\{ \begin{array}{c} 0 \\ REF_2 \end{array} \right\} \quad (10)$$

In step 705, the flow stream characteristic measurements obtained above are inserted into a (4×4) matrix (see equation (13) below). A matrix inversion is solved in order to generate the flow calibration factors $FCF_{11}$, $FCF_{12}$, $FCF_{21}$, and $FCF_{22}$. These flow calibration factors are used for subsequent flow stream characteristic computations, including normal operational determinations of mass flow rate, density, viscosity, etc.

There are now 4 equations and 4 unknowns. The known (i.e., measured) quantities are REF$_1$, REF$_2$, $\Delta t_1^1$, $\Delta t_2^1$, $\Delta t_1^2$, $\Delta t_2^2$, $\Delta t_1^0$, and $\Delta t_2^0$. It should be recalled that, per the zeroing step:

$$z_1 = \Delta t_1^0 \quad (11a)$$

$$z_2 = \Delta t_2^0 \quad (11b)$$

The unknown quantities are the flow calibration factors $FCF_{11}$, $FCF_{12}$, $FCF_{21}$, and $FCF_{22}$. These FCFs are the values that are to be determined in the calibration process.

This can then be assembled into a 4×4 matrix equation:

$$\begin{bmatrix} \Delta t_1^1 - z_1 & \Delta t_2^1 - z_2 & 0 & 0 \\ 0 & 0 & \Delta t_1^1 - z_1 & \Delta t_2^1 - z_2 \\ \Delta t_1^2 - z_1 & \Delta t_2^2 - z_2 & 0 & 0 \\ 0 & 0 & \Delta t_1^2 - z_1 & \Delta t_2^2 - z_2 \end{bmatrix} \left\{ \begin{array}{c} FCF_{11} \\ FCF_{12} \\ FCF_{21} \\ FCF_{22} \end{array} \right\} = \left\{ \begin{array}{c} REF_1 \\ 0 \\ 0 \\ REF_2 \end{array} \right\} \quad (12)$$

Then solved with a 4×4 matrix inverse:

$$\left\{ \begin{array}{c} FCF_{11} \\ FCF_{12} \\ FCF_{21} \\ FCF_{22} \end{array} \right\} = \begin{bmatrix} \Delta t_1^1 - z_1 & \Delta t_2^1 - z_2 & 0 & 0 \\ 0 & 0 & \Delta t_1^1 - z_1 & \Delta t_2^1 - z_2 \\ \Delta t_1^2 - z_1 & \Delta t_2^2 - z_2 & 0 & 0 \\ 0 & 0 & \Delta t_1^2 - z_1 & \Delta t_2^2 - z_2 \end{bmatrix}^{(-1)} \left\{ \begin{array}{c} REF_1 \\ 0 \\ 0 \\ REF_2 \end{array} \right\} \quad (13)$$

Figure 8:
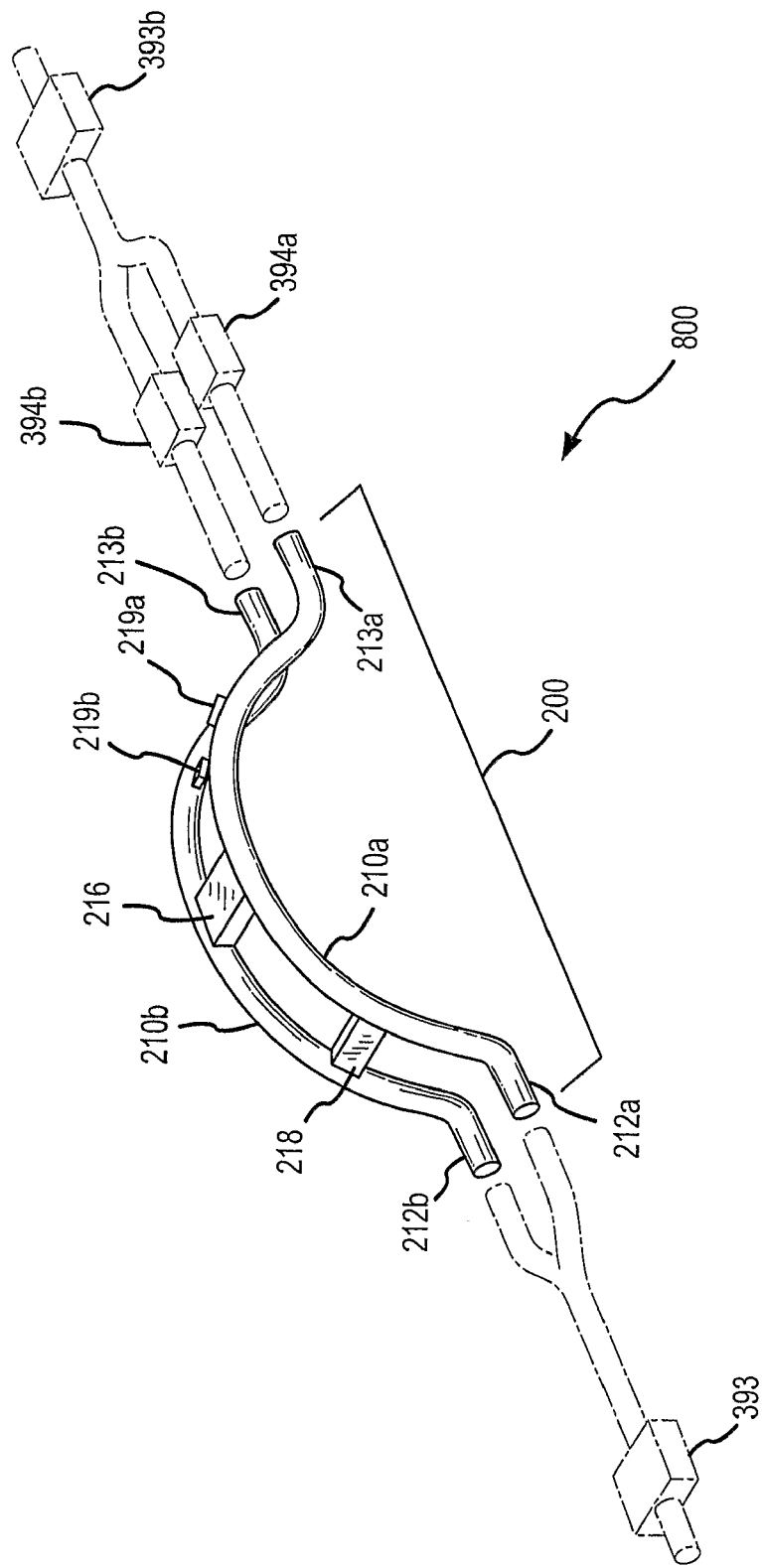
FIG. 8 shows a calibration setup according to an embodiment of the invention.

FIG. 8 shows a calibration setup 800 according to an embodiment of the invention. The calibration setup 800 can include first and second valves 394a and 394b and a single reference meter 393. The first and second valves 394a and 394b can be controlled to conduct a first flow stream through the first flow conduit 210a, to conduct a second flow stream through the second flow conduit 210b, or to conduct a combined flow stream through both flow conduits 210a and 210b.

The reference meter 393 is shown located after the three pickoff sensor flow meter 200 and after the valves 394a and 394b. However, as shown by the dashed lines, the reference meter 393 (and/or the valves 394a and 394b) can be located upstream of the flow meter 200.

It should be understood that for calibration setup 800, the values REF$_1$ and REF$_2$ are generated by the reference meter 393 at different times. For example, during a calibration process, the first flow stream through the first flow conduit 210a is generated by opening the first valve 394a and closing the second valve 394b. The reference measurement subsequently generated by the reference meter 393 is the REF$_1$ value. Then, the first valve 394a is closed and the second valve 394b is opened in order to create the second flow through the second flow conduit 210b. The reference measurement subsequently generated by the reference meter 393 is the REF$_2$ value.

Unlike the prior art, the three pickoff sensor flow meter can share one upstream or downstream pickoff sensor. Unlike the prior art, the pickoff sensors of the three pickoff sensor flow meter require only four wires. As a result, the three pickoff sensor flow meter can employ a common nine wire cabling currently used by conventional flow meters. This enables the use of the conventional flow meter wiring techniques, wiring feedthrough, electrical connections, and electrical housing. The use of three pickoff sensors instead of four pickoff sensors therefore saves wiring, space, hardware, and assembly time.

In the invention, the flow stream characteristic measurements are substantially simultaneously obtained for two independent flow streams. Unlike the prior art, a common driver vibrates two flow conduits that are conducting two independent flow streams. Unlike the prior art, the flow streams can flow at different flow rates. Unlike the prior art, the flow streams can have different densities. Unlike the prior art, the flow conduits can have differing cross-sectional areas. Unlike the prior art, the flow meter can share drivers, eliminating at least one driver.

Advantageously, cost of the flow meter will be lower due to the sharing of components. In addition, the overall size of the flow meter (and a complete metering/dispensing system) can be reduced. In addition, a common driver and a shared pickoff sensor reduce power consumption and enable the utilization of a single, smaller electronic power source.

What is claimed is:

1. A three pickoff sensor flow meter (200), comprising:
a first flow conduit (210a) conducting a first flow stream;
a second flow conduit (210b) that is independent of the first flow stream;
a common driver (216) configured to vibrate the first flow conduit (210a) and the second flow conduit (210b); and
three pickoff sensors (218, 219a, 219b) configured to provide first and second time delay values ($\Delta t_1$) and ($\Delta t_2$) for the first flow conduit (210a) and the second flow conduit (210b).

2. The flow meter (200) of claim 1, with the first flow conduit (210a) and the second flow conduit (210b) originating from a common inlet (212).

3. The flow meter (200) of claim 1, with the first flow stream originating from a first inlet (212a) and with the second flow stream originating from a second inlet (212b).

4. The flow meter (200) of claim 1, with the flow meter (200) comprising a Coriolis flow meter.

5. The flow meter (200) of claim 1, with the flow meter (200) comprising a vibrating densitometer.

6. The flow meter (200) of claim 1, further comprising meter electronics (20), with the three pickoff sensors (218, 219a, 219b) being coupled to the meter electronics (20) by four or more wires (100).

7. The flow meter (200) of claim 1, with the three pickoff sensors (218, 219a, 219b) comprising:
a shared pickoff sensor (218) configured to generate a shared vibrational response from vibration of both the first flow conduit (210a) and the second flow conduit (210b);
a first independent pickoff sensor (219a) configured to generate a first independent vibrational response from vibration of the first flow conduit (210a); and
a second independent pickoff sensor (219b) configured to generate a second independent vibrational response from vibration of the second flow conduit (210b).

8. The flow meter (200) of claim 1, with the three pickoff sensor flow meter (200) being configured to vibrate the first flow conduit (210a) conducting the first flow stream and vibrate the second flow conduit (210b), with the vibrating being performed by the common driver (216), receive a first vibrational response of the first flow conduit (210a), with the first vibrational response being generated from a shared pickoff sensor (218) and from a first independent pickoff sensor (219a), receive a second vibrational response of the second flow conduit (210b), with the second vibrational response being generated from the shared pickoff sensor (218) and from a second independent pickoff sensor (219b), and determine a first flow stream characteristic from the first vibrational response and the second vibrational response.

9. A three pickoff sensor flow meter (200), comprising:
meter electronics (20) configured to receive measurement signals;
a first flow conduit (210a) conducting a first flow stream;
a second flow conduit (210a) that is independent of the first flow stream;
a common driver (216) configured to vibrate the first flow conduit (210a) and the second flow conduit (210b); and
three pickoff sensors (218, 219a, 219b) coupled to the meter electronics (20) by four wires (100).

10. The flow meter (200) of claim 9, with the first flow conduit (210a) and the second flow conduit (210b) originating from a common inlet (212).

11. The flow meter (200) of claim 9, with the first flow conduit (210a) originating from a first inlet (212a) and with the second flow conduit (210b) originating from a second inlet (212b).

12. The flow meter (200) of claim 9, with the flow meter (200) comprising a Coriolis flow meter.

13. The flow meter (200) of claim 9, with the flow meter (200) comprising a vibrating densitometer.

14. The flow meter (200) of claim 9, further comprising meter electronics (20), with the three pickoff sensors (218, 219a, 219b) being configured to provide first and second time delay values ($\Delta t_1$) and ($\Delta t_2$)) for the first flow conduit (210a) and the second flow conduit (210b).

15. The flow meter (200) of claim 9, with the three pickoff sensors (218, 219a, 219b) comprising:
a shared pickoff sensor (218) configured to generate a shared vibrational response from vibration of both the first flow conduit (210a) and the second flow conduit (210b);
a first independent pickoff sensor (219a) configured to generate a first independent vibrational response from vibration of the first flow conduit (210a); and
a second independent pickoff sensor (219b) configured to generate a second independent vibrational response from vibration of the second flow conduit (210b).

16. The flow meter (200) of claim 9, with the three pickoff sensor flow meter (200) being configured to vibrate the first flow conduit (210a) conducting the first flow stream and vibrate the second flow conduit (210b), with the vibrating being performed by the common driver (216), receive a first vibrational response of the first flow conduit (210a), with the first vibrational response being generated from a shared pickoff sensor (218) and from a first independent pickoff sensor (219a), receive a second vibrational response of the second flow conduit (210b), with the second vibrational response being generated from the shared pickoff sensor (218) and from a second independent pickoff sensor (219b), and determine a first flow stream characteristic from the first vibrational response and the second vibrational response.

17. A three pickoff sensor flow meter (200), comprising:
a first flow conduit (210a) conducting a first flow stream;
a second flow conduit (210b) that is independent of the first flow stream;
a common driver (216) configured to vibrate the first flow conduit (210a) and the second flow conduit (210b);
a shared pickoff sensor (218) configured to generate a shared vibrational response from vibration of both the first flow conduit (210a) and the second flow conduit (210b);
a first independent pickoff sensor (219a) configured to generate a first independent vibrational response from vibration of the first flow conduit (210a); and a second independent pickoff sensor (219b) configured to generate a second independent vibrational response from vibration of the second flow conduit (210b).

18. The flow meter (200) of claim 17, with the first flow conduit (210a) and the second flow conduit (210b) originating from a common inlet (212).

19. The flow meter (200) of claim 17, with the first flow conduit (210a) originating from a first inlet (212a) and with the second flow conduit (210b) originating from a second inlet (212b).

20. The flow meter (200) of claim 17, with the flow meter (200) comprising a Coriolis flow meter.

21. The flow meter (200) of claim 17, with the flow meter (200) comprising a vibrating densitometer.

22. The flow meter (200) of claim 17, further comprising meter electronics (20), with the shared pickoff sensor (218), the first independent pickoff sensor (219a), and the second independent pickoff sensor (219b) being coupled to the meter electronics (20) by four or more wires (100).

23. The flow meter (200) of claim 17, with the three pickoff sensors (218, 219a, 219b) being configured to provide first and second time delay values ($\Delta t_1$) and ($\Delta t_2$) for the first flow conduit (210a) and the second flow conduit (210b).

24. The flow meter (200) of claim 17, with the three pickoff sensor flow meter (200) being configured to vibrate the first flow conduit (210a) conducting the first flow stream and vibrate the second flow conduit (210b), with the vibrating being performed by the common driver (216), receive a first vibrational response of the first flow conduit (210a), with the first vibrational response being generated from the shared pickoff sensor (218) and from the first independent pickoff sensor (219a), receive a second vibrational response of the second flow conduit (210b), with the second vibrational response being generated from the shared pickoff sensor (218) and from the second independent pickoff sensor (219b), and determine a first flow stream characteristic from the first vibrational response and the second vibrational response.

25. A measurement method for a three pickoff sensor flow meter, comprising:
   vibrating a first flow conduit conducting a first flow stream and vibrating a second flow conduit, with the vibrating being performed by a common driver;
   receiving a first vibrational response of the first flow conduit, with the first vibrational response being generated from a shared pickoff sensor and from a first independent pickoff sensor;
   receiving a second vibrational response of the second flow conduit, with the second vibrational response being generated from the shared pickoff sensor and from a second independent pickoff sensor; and
   determining a first flow stream characteristic from the first vibrational response and the second vibrational response.

26. The measurement method of claim 25, with the second flow conduit having zero flow.

27. The measurement method of claim 25, with the second flow conduit conducting a second flow stream.

28. The measurement method of claim 25, with the first flow conduit and the second flow conduit originating from a common input.

29. The measurement method of claim 25, with the first flow conduit originating from a first input and with the second flow conduit originating from a second input.

30. The measurement method of claim 25, with the second flow conduit conducting a second flow stream that is independent of the first flow stream and with the method further comprising determining a second flow stream characteristic from the first vibrational response and the second vibrational response.

31. The measurement method of claim 25, with the determining further comprising using the first vibrational response and the second vibrational response in equations $$\dot{m}_1 = FCF_{11}(\Delta t_{11} - \Delta tz_{11}) \times (1 - Tc_1 \times Tm_1) + FCF_{12}(\Delta t_{12} - \Delta tz_{12}) \times (1 - Tc_2 \times Tm_2)$$

and $$\dot{m}_2 = FCF_{22}(\Delta t_{22} - \Delta tz_{22}) \times (1 - Tc_2 \times Tm_2) + FCF_{21}(\Delta t_{21} - \Delta tz_{21}) \times (1 - Tc_1 \times Tm_1)$$

in order to determine a first mass flow rate ($\dot{m}_1$) of the first flow stream and a second mass flow rate ($\dot{m}_2$) of the second flow stream.

32. The measurement method of claim 25, with the determining further comprising using the first vibrational response and the second vibrational response in equations $$\dot{m}_1 = FCF_{11}(\Delta t_1 - \Delta tz_1) \times (1 - Tc_1 \times Tm_1) + FCF_{12}(\Delta t_2 - \Delta tz_2) \times (1 - Tc_2 \times Tm_2)$$

and $$\dot{m}_2 = FCF_{22}(\Delta t_2 - \Delta tz_2) \times (1 - Tc_2 \times Tm_2) + FCF_{21}(\Delta t_1 - \Delta tz_z) \times (1 - Tc_1 \times Tm_1)$$

in order to determine a first mass flow rate ($\dot{m}_1$) of the first flow stream and a second mass flow rate ($\dot{m}_2$) of the second flow stream.

33. The measurement method of claim 25, further comprising:
   zeroing out the three pickoff sensor flow meter for a calibration process;
   zeroing out one or more reference meters in communication with the three pickoff sensor flow meter;
   measuring a first flow through the first flow conduit of the three pickoff sensor flow meter using the three pickoff sensor flow meter and using the one or more reference meters;
   measuring a second flow through the second flow conduit of the three pickoff sensor flow meter using the three pickoff sensor flow meter and using the one or more reference meters; and
   determining two flow calibration factors (FCFs) for the three pickoff sensor flow meter using a first flow measurement and a second flow measurement.

34. The measurement method of claim 33, with the determining comprising determining the two flow calibration factors (FCFs) for the three pickoff sensor flow meter using the equation $$\begin{Bmatrix} FCF_{11} \\ FCF_{12} \\ FCF_{21} \\ FCF_{22} \end{Bmatrix} = \begin{bmatrix} \Delta t_1^1 - z_1 & \Delta t_2^1 - z_2 & 0 & 0 \\ 0 & 0 & \Delta t_1^1 - z_1 & \Delta t_2^1 - z_2 \\ \Delta t_1^2 - z_1 & \Delta t_2^2 - z_2 & 0 & 0 \\ 0 & 0 & \Delta t_1^2 - z_1 & \Delta t_2^2 - z_2 \end{bmatrix}^{(-1)} \begin{Bmatrix} REF_1 \\ 0 \\ 0 \\ REF_2 \end{Bmatrix}.$$

35. The measurement method of claim 33, with the determining comprising determining the two flow calibration factors (FCFs) for the three pickoff sensor flow meter using the equation $$\begin{Bmatrix} \dot{m}_1 \\ \dot{m}_2 \end{Bmatrix} = \begin{bmatrix} FCF_{11} & FCF_{12} \\ FCF_{21} & FCF_{22} \end{bmatrix} \begin{Bmatrix} \Delta t_1 - z_1 \\ \Delta t_2 - z_2 \end{Bmatrix}.$$

36. A calibration method for a three pickoff sensor flow meter, the method comprising:
  zeroing out the three pickoff sensor flow meter;
  zeroing out one or more reference meters in communication with the three pickoff sensor flow meter;
  measuring a first flow through a first flow conduit of the three pickoff sensor flow meter using the three pickoff sensor flow meter and using the one or more reference meters;
  measuring a second flow through a second flow conduit of the three pickoff sensor flow meter using the three pickoff sensor flow meter and using the one or more reference meters; and
  determining two flow calibration factors (FCFs) for the three pickoff sensor flow meter using a first flow measurement and a second flow measurement.

37. The calibration method of claim 36, with the determining comprising determining the two flow calibration factors (FCFs) for the multiple flow conduit flow meter using the equation $$\begin{Bmatrix} FCF_{11} \\ FCF_{12} \\ FCF_{21} \\ FCF_{22} \end{Bmatrix} = \begin{bmatrix} \Delta t_1^1 - z_1 & \Delta t_2^1 - z_2 & 0 & 0 \\ 0 & 0 & \Delta t_1^1 - z_1 & \Delta t_2^1 - z_2 \\ \Delta t_1^2 - z_1 & \Delta t_2^2 - z_2 & 0 & 0 \\ 0 & 0 & \Delta t_1^2 - z_1 & \Delta t_2^2 - z_2 \end{bmatrix}^{(-1)} \begin{Bmatrix} REF_1 \\ 0 \\ 0 \\ REF_2 \end{Bmatrix}.$$

38. The calibration method of claim 36, with the determining comprising determining the two flow calibration factors (FCFs) for the multiple flow conduit flow meter using the equation $$\begin{Bmatrix} \dot{m}_1 \\ \dot{m}_2 \end{Bmatrix} = \begin{bmatrix} FCF_{11} & FCF_{12} \\ FCF_{21} & FCF_{22} \end{bmatrix} \begin{Bmatrix} \Delta t_1 - z_1 \\ \Delta t_2 - z_2 \end{Bmatrix}.$$

* * * * *